United States Patent Office 3,531,202
Patented Sept. 29, 1970

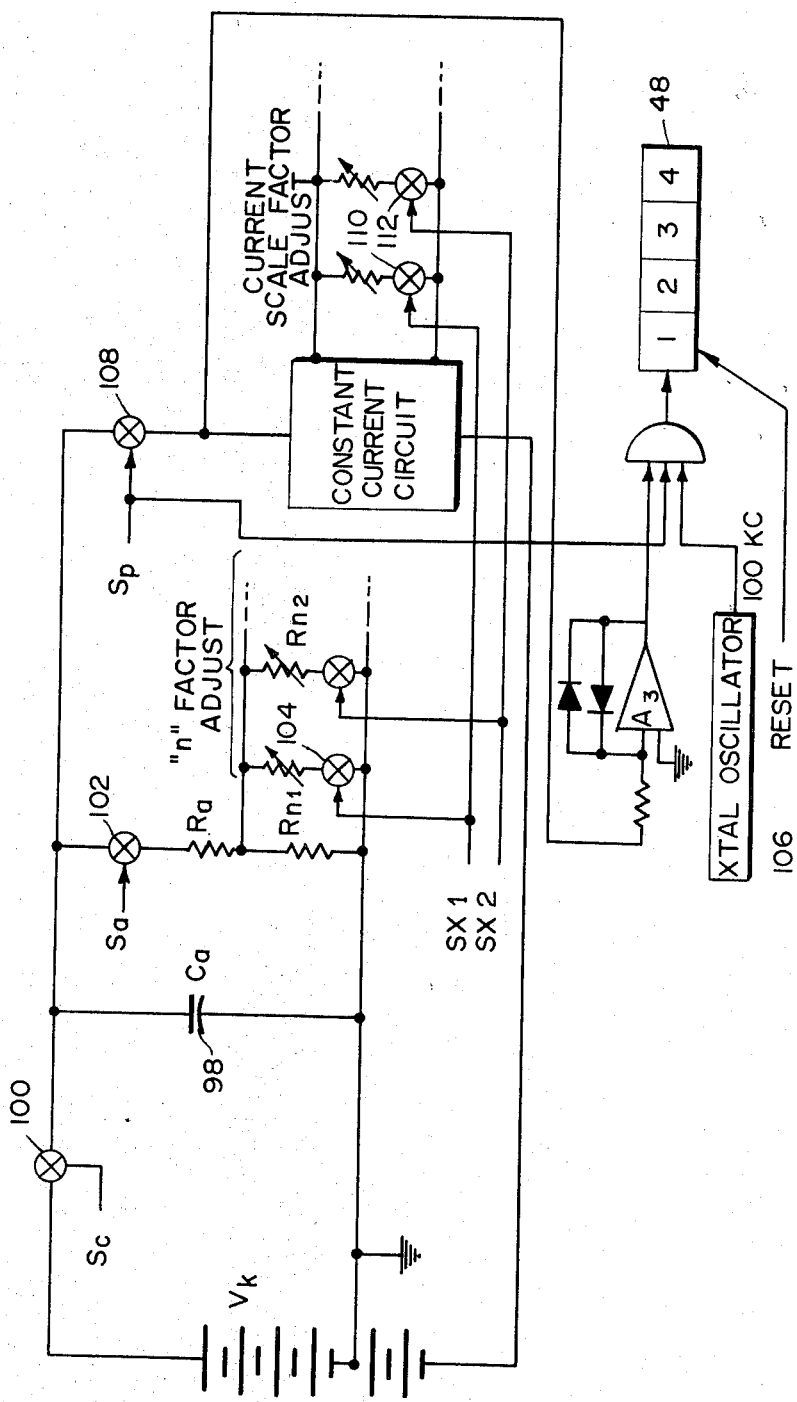

3,531,202
SPECTROMETER READOUT SYSTEM
Hugh Malcolm Wilkinson, Winchester, and Philip Spergel, Lexington, Mass., assignors to Baird-Atomic, Inc., Cambridge, Mass., a corporation of Massachusetts
Filed Nov. 14, 1966, Ser. No. 593,796
Int. Cl. G01j 3/36
U.S. Cl. 356—81   5 Claims

ABSTRACT OF THE DISCLOSURE

Information as to the concentration of a selected monitored element in an emmission spectrometer is provided through a direct readout system. An analog-digital converter changes the voltage stored on capacitors charged by spectrum responsive photo-multiplier tubes to an output which is the log discharge time period this being measured and stored by a scaler. A computer and programmer are connected to the converter and the scaler to provide an output representing the direct percentage of concentration of the monitored element.

---

Figure 1:
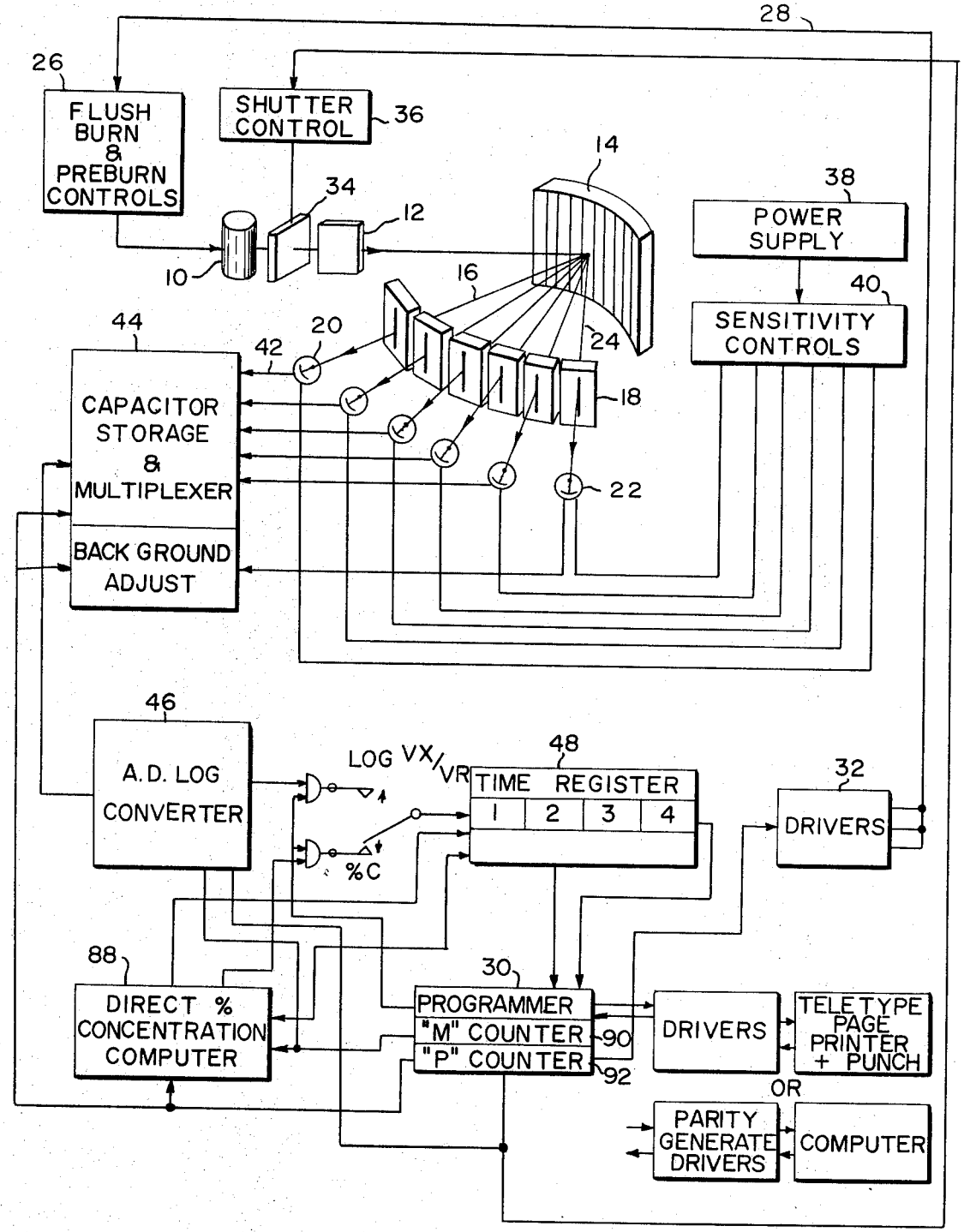

This invention relates generally to spectrometer readout systems and more particularly is directed towards a transistorized, high-speed automatic sequential readout and direct percent concentration computer for use with direct reading spectrometers.

Broadly defined, a direct reading spectrometer is an apparatus adapted to indicate automatically the chemical composition of a specimen for determining the intensity distribution of radiation of characteristic wavelengths emitted by the specimen under excitation. Typically, a direct reading spectrometer comprises an entrance slit that transmits radiation from an electrically excited specimen against a diffraction grating that disperses the radiation into a spectrum. A spectrometer also includes a plurality of exit slits arrayed at selected spaced intervals for transmitting the radiation of preselected wavelengths to photocell channels in order to determine the differing intensities of the radiation at these wavelengths.

In an automatic spectrometer, the readout system usually employs a series of photocell channels each including a capacitor which builds up a charge corresponding to the intensity of the monitored wavelength. The readout is obtained by comparing the charge on the measuring capacitor with the charge on a reference capacitor. This measurement is usually carried out by a logarithmic discharge technique. Apparatus of this type is more fully described in U.S. Pat. 2,937,561 and in commonly assigned co-pending application Ser. No. 375,491.

In general, spectrometers are designed to present their analytical output data either sequentially or simultaneously. In a serial readout, the capacitors, each charged to a certain voltage by its associated tube output, are connected in sequence whereas in the simultaneous display the data in all tubes are presented at once.

Existing spectrometer output systems are relatively slow and normally require additional computations in order to determine the concentration of the selected monitored element.

It is an object of the present invention to provide a solid state high-speed automatic sequential readout system for an emission spectrometer.

Another object of this invention is to provide a direct percent concentration computer system for use with an emission spectrometer. A more general object of this invention is to provide improvements in spectrometer readout systems.

More particularly, this invention features a spectrometer readout system comprising storage means for temporarily storing the output of a series of photomultiplier tubes positioned to monitor selected spectral lines, and an analog-digital converter for converting the voltages stored in the storage means into digital form which is logarithmically related to a known and an unknown signal. The output of the converter is the log discharge time period which is measured and stored by a time register scaler. A computer and programmer are operatively connected to the converter and the register with the computer being adapted to provide an output which is a representation of the direct percentage of concentration of the monitored element. The programmer controls the sequence operation of the system and also provides an output to a tape, printer or the like.

Figure 2:
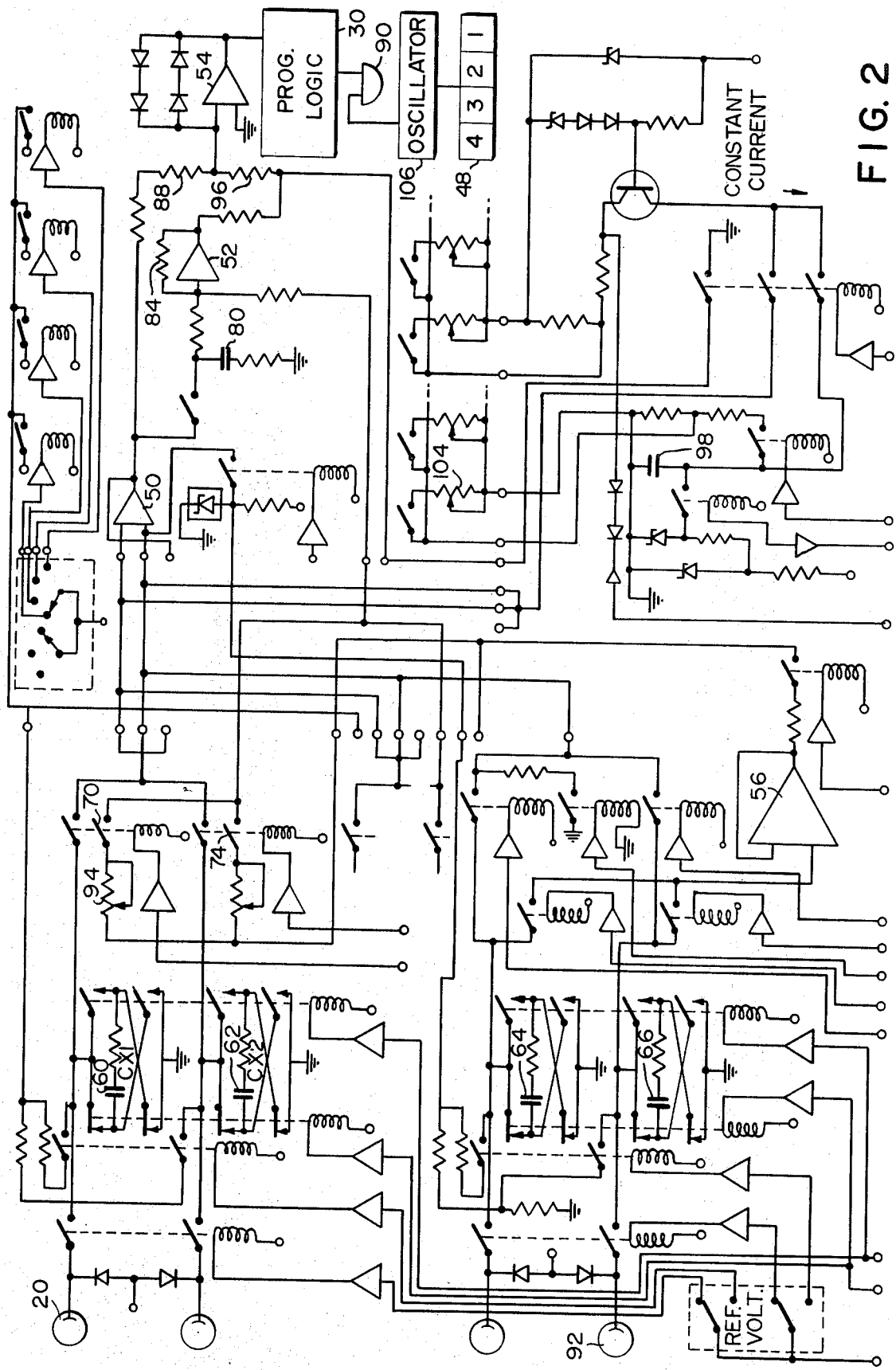
Figure 3:
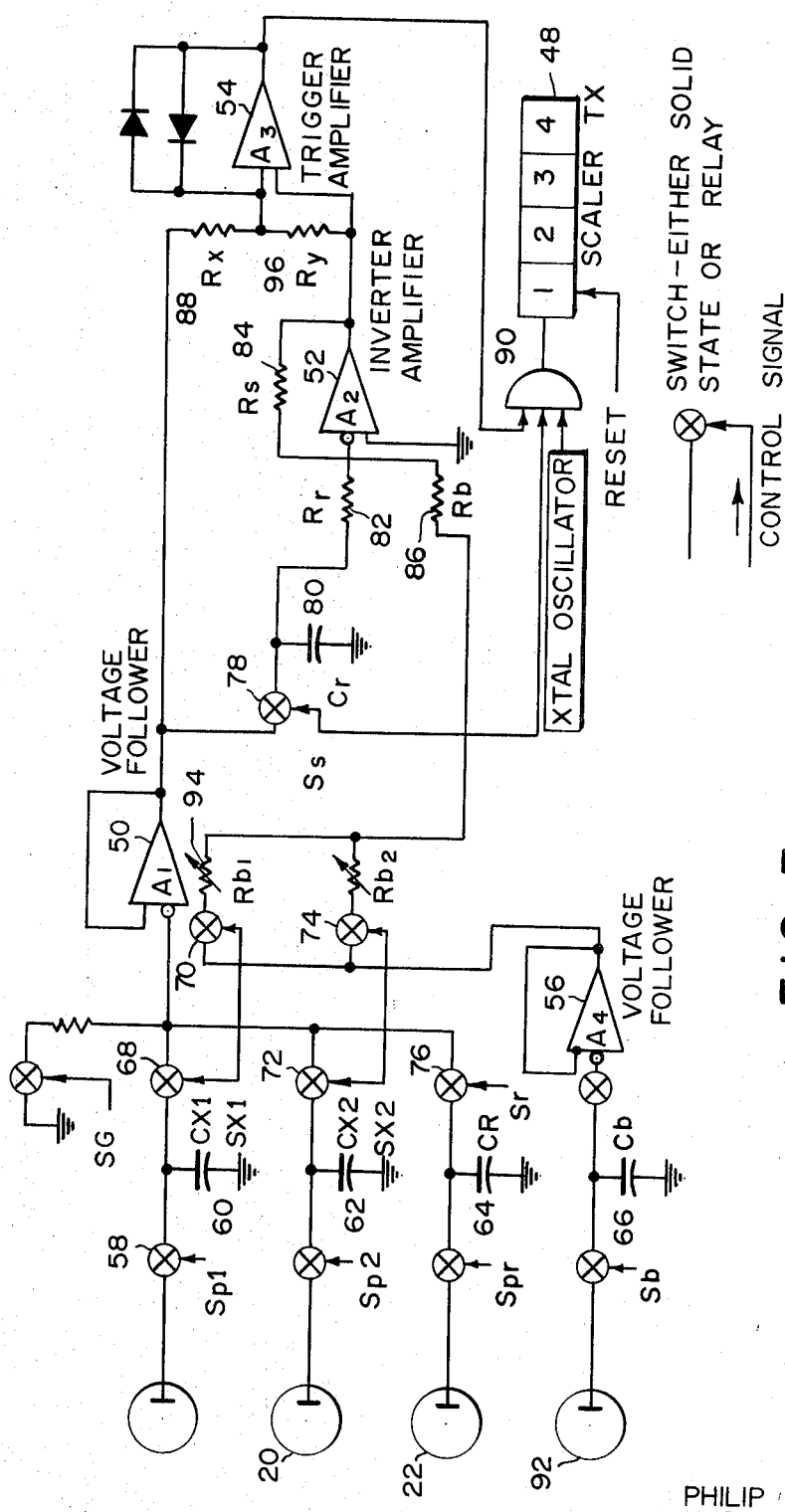

However, these and other features of the invention along with further objects and advantages thereof will become more readily apparent from the following detailed description of a preferred embodiment of the invention with reference being made to the accompanying drawings in which:

FIG. 1 is a somewhat schematic block diagram of a spectrometer readout system made according to the invention, FIG. 2 is a circuit diagram for the sequential measurement system, the analog-digital converter, and the percent concentration unit, FIG. 3 is a circuit diagram for the logarithmic converter, and FIG. 4 is a circuit diagram for the direct percent computation computer.

Referring now to the drawings and particularly to FIG. 1, the reference character 10 generally indicates an electrically excited gap in which a specimen is placed for excitation. The resulting radiation is passed through an entrance slit 12 against a curved diffraction grating 14 which disperses the radiation into a spectrum, rays of which are shown at 16. These spectral components pass through a plurality of exit slits 18 distributed in predetermined spaced relation in an arc oppositely the grating for transmitting isolated wavelengths of the spectrum. A bank of photocells 20 is provided to receive wavelengths 16 with a photocell 22 being positioned to receive a reference spectrum line 24. The photocells 20 are positioned to receive the spectrum lines 16 and each of the photocells generates a signal for a wavelength intensity comparison. The spark gap 10 is actuated by a control unit 26 which receives appropriate timing signals by a lead 28 from a programmer 30 through drivers 32. The control unit 26 provides flush, burn and preburn control operations of the spark gap. In practice a shutter 34 is disposed between the spark gap 10 and the slit 12.

A shutter control 36, also actuated by the programmer 30, is operatively connected to the shutter 34 and is adapted to open and close the shutter for preselected periods. The photomultiplier tubes 20 and 22 are energized from a suitable power source 38 provided with the usual sensitivity controls 40. The anodes for the photomultiplier tubes are connected by leads 42 to a capacitor storage and multiplexer unit generally indicated by reference character 44 in FIG. 1. In operation, the capacitors within the unit integrate the outputs of the photomultiplier tubes during the expose period, which typically is on the order of 10 to 20 seconds. During the measurement cycle, the capacitor voltages are fed sequentially to an analog-digital converter 46 in which log measurements are performed. The output from the converter 46 is the log discharge time period $t_x$ which is measured and stored by a time register scaler 48.

BASIC FORMULAE

By way of introduction, the development of the basic formula employed in these measurements will be reviewed. The voltage $V_x$ which is due to the emission line of a particular unknown element X is obtained by subtracting from the measured voltage $V_{mx}$, the voltages due to background and dark current.

$$V_x = V_{mx} - V_{bx} - V_{dx} \tag{1}$$

The reference voltage $V_R$ also is slightly lower due to background and dark current. However, the reference emission line is normally much stronger than weaker element lines. Also, the strength of the reference line, when measuring any sample, will be quite close to the value existing when the calibrating standard was measured. Therefore, reference background and dark current can safely be ignored.

Having made the above corrections to obtain $V_x$, the percent concentration for a particular element X in a matrix material has been found to be, $$\text{Percent } C = K(V_x/V_R)^n \tag{2}$$

where

Percent C is the actual percent concentration
K is a scale factor
$V_x$ is the voltage on the $x$ integrating capacitor due to the unknown element $x$ (see (1) above)
$V_R$ is the reference voltage
$n$ is a constant which, is 1 or greater but never more than 2, depending on the particular element.

The unique Baird-Dow measurement technique has always used a logarithmic voltage to time conversion method to obtain a value which is the logarithm of the ratio of the unknown to the reference voltage. This is accomplished by placing a resistor $R_r$ across a capacitor $C_r$ causing it to discharge logarithmicaly from reference voltage $V_R$ until it is equal in value to the voltage $V_x$. The discharge time $t$ then represents the log of the ratio. The equations are $$V_x = V_R e^{-t_x/R_r C_r} \tag{3}$$

which converts to $$\log V_x/V_R = -t_x/R_r C_r$$

or $$t_x = -R_r C_r \log V_x/V_R \tag{4}$$

Values of $t_x$ have been called clock or scaler readings. Curves of actual percent concentration vs. clock reading have been prepared for many installations. They are normally plotted on semilog paper. The negative sign in Equation 4 explains why these plots have negative slopes. When the background has not been subtracted, the curve drops off asymtopically at lower concentrations to a vertical line. (Inversion may also cause a deviation from a straight line at high concentrations due to saturation. However, this effect can be circumvented by choosing a weaker line for concentrations where this begins to occur.) For the normal case, where background has been subtracted and the effect of dark current eliminated, the percent concentration vs. clock readings ($t_x$) is a perfectly straight line when plotted on semilog paper. In other words, it exactly fits Equation 4.

The basis for the new direct percent concentration antilog computer is as follows:

Repeating Equations 2 and 4

$$\text{Percent } C = K(V_x/V_R)^n \tag{2}$$

$$t_x = -R_r C_r \log V_x/V_R \tag{4}$$

The log of Equation 2 is $$\log (\text{percent } C/K) = n \log (V_x/V_R)$$

or $$\log V_x/V_R = (1/n) \log (\text{percent } C/K) \tag{5}$$

Substituting (5) in (4) we get $$t_x = -(R_r C_r/n) \log \text{percent } C/K) \tag{6}$$

which converts to $$\log (\text{percent } C/K) = -nt_x/R_r C_r \tag{7}$$

The basic antilog circuitry to solve Equation 7 also employs an RC log discharge circuit. If a capacitor $C_a$ is charged to a voltage $V_s$ and then discharge by resistor $R_a$ for time $t_a$ the voltage $V_a$ on the capacitor will be $$V_a = V_K e^{-t_a/R_a C_a} \tag{8}$$

which converts to $$\log V_a/V_K = -t_a/R_a C_a$$

or $$t_a = -R_a C_a \log V_a/V_K \tag{9}$$

If we make $t_a$ of Equation 9 equal to $t_x$ of Equation 6 and combine the equations we get $$-(R_r C_r n) \log \text{percent } C/K = -R_a C_a \log V_a/V_k$$

or $$\log \text{percent } C/K = (nR_a C_a/R_r C_r) \log V_a/V_k \tag{10}$$

If we select the values of $R_a$, $C_a$, $R_r$ or $C_r$ so the term in the bracket is exactly 1 when $n$ is its required value between 1 and 2, then $$\log \text{percent } C/K = \log V_a/V_k \tag{11}$$

Taking the antilog of both sides, we get $$\text{Percent } C = KV_a/V_k \tag{12}$$

Thus if $V_k$ is chosen to make scale factor $K/V_k$ equal to 1 then $$\text{Percent } C = V_a \text{ directly} \tag{13}$$

Thus the value of the actual percent concentration may be determined by measuring $V_a$. This is the voltage on capacitor $C_a$ at the end of time $t_a$ (or $t_x$). This is the basis of the new direct percent concentration antilog computer to be described herein.

LOGARITHMIC CONVERTER WITH BACKGROUND SUBTRACT

The new high speed sequential logarithmic converter is implemented basically as shown in FIGS. 2 and 3. It incorporates four solid state operational amplifiers 50, 52, 54 and 56. High quality amplifiers, low leakage capacitors and high performance switches are employed to obtain optimum performance and accuracy with the system. The sequence of operations of the electronic circuitry shown in FIGS. 2 and 3 is as follows:

(a) During the "burn" or "expose" period, switches 58 connecting integrating capacitors 60 to the photomultiplier tubes 20 are closed and capacitors 60, 62, 64 and 66 integrate the photomultiplier tube output currents. (Switches 68, 70, 72 and 74 controlled by signals $S_x 1$ and $S_x 2$ are open.)

(b) At the end of the expose period, signals $S_p 1$, $S_p 2$, etc., disconnect the photomultiplier tubes 20 and the programmer 30 advances to the "measure" period.

(c) During the "measure" period the (log $V_x/V_R$) values for each element are determined sequentially. To measure element No. 1, signals $S_k$ and $S_s$ first close their respective switches 76 and 78 to charge capacitor 80 to the same voltage as exists on reference capacitor 64. Since voltage-follower amplifier 50 has extremely high input impedance (of the order of $10^{12}$ ohms), this operation is performed while leaving the voltage on 64 essentially unchanged.

(d) Having charged capacitor 80, switch 78 is then opened, and capacitor 80 is discharged logarithmically via resistor 82. This resistor serves a dual purpose. It is the log discharge resistor for capacitor 80 since the terminal connected to the input of amplifier 52 is maintained at ground potential at all times. It also serves as the input resistor to inverting amplifier 52 whose output is a positive voltage which is always exactly proportional to the negative voltage on capacitor 80 by the ratio $R_s/R_r$, $R_s$ being resistor 84 and $R_r$ being resistor 82 (neglecting the input from resistor 86 for the time being).

(e) As soon as switch 78 opens, switch 76 is opened and the switches 68 and 70 controlled by signal $S_x1$ close, which now transfers the $V_x1$ voltage on capacitor 60, via amplifier 50 to trigger amplifier 54 via input resistor 88. Also, gate 90 which controls the scaler 48, closes, enabling it to begin counting the 100 kc. accurate timing pulses. As soon as the voltage on capacitor 80 has discharged to the point where voltage $V_r$ is exactly equal to voltage $V_x1$ the input to amplifier 54 passes through zero and the scaler 48 is halted. The time $t_x$ which has just been recorded is determined by Equation 3, i.e., $$Vx = V_R e^{-t_x(R_r C_r)} \quad (3)$$

(f) Now let us describe the background circuit which has been ignored in (a) through (e) above. The background light is obtained by positioning a photomultiplier tube 92 which will avoid any of the element lines but pickup background light only. During the expose period a voltage proportional to background was accumulated on capacitor 66.

A selected portion of the output of the voltage accumulated on capacitor 66 is subtracted from the voltage $V_x$ which appears at the output of amplifier 50. Control signal $S_x$ switches in adjustable resistor 94 which determines the proportion of the background which is to be subtracted for element 1. The negative polarity background signal is inverted by amplifier 52 and appears at the input to resistor 96 as a positive voltage. Since voltage $V_x1$ appears as a negative voltage at the input to resistor 88, the background voltage is effectively subtracted from $V_x1$.

Photomultiplier tube dark current effect may be cancelled by reversing capacitors 60, 62, etc. and placing a shutter in the emission light path so that the capacitor charges in the opposite direction. (The reversing switches are not shown in FIG. 3.) The reverse time must be exactly equal to the actual expose time. In the new high speed sequential measurement system the instrument user is given a choice of three modes for dark current cancellation.

(a) Expose during odd seconds and cancel during even seconds. (The total burn period must be set to an even number in this case.)

(b) Cancel during the "preburn" period only.

(c) Cancel during the "mush" plus "preburn" periods. In cases (b) and (c) these times must equal the "burn" period.

DIRECT PERCENT CONCENTRATION ANTILOG COMPUTER SYSTEM

The Direct Percent Concentration Computer is shown in FIGS. 2 and 4. The log conversion circuit described above functions by discharging a capacitor logarithmically until it reaches the independent voltage while measuring the discharge time ($t_x$). The antilog conversion circuit described here functions by discharging a capacitor for an independent time $t_a$ and then measuring the voltage ($V_a$) which it reaches at that time.

Referring to FIG. 4, capacitor 98 is charged to voltage $V_k$ by switch 100 controlled by signal $S_c$. (Switch 102 controlled by signal $S_a$ is closed and the one controlled by $S_1$ is open.) The discharge time $t_a$ begins when the scaler measuring $t_x$ (48 in FIG. 3) passes through zero counts. (It may have been preset to some value "less than" zero, e.g., 500 to (actually 9500) as a result of standardization.) At this time $S_c$ opens switch 100 while $S_a$ keeps switch 102 closed. At the end of time $t_a$ the switch 102 controlled by $S_a$ also opens leaving capacitor 98 holding voltage $V_a$. This voltage may then be read right away or we can store this voltage on the capacitor, if so desired, until the (log $V_x/V_R$) or "clock" reading stored in the scaler is read. This will normally be done only during calibration or checking. The next step is to measure accurately the voltage on capacitor 98 which represents the true percent concentration of the unknown element. Adjustable resistor 104 is switched in by control signal $S_x1$ to select the correct value of $n$ for element 1 (see Formulae 2 and 10).

This voltage is determined by measuring the time required to discharge capacitor 98 linearly to zero potential. This is a conventional analog to digital conversion technique. The scaler is first reset to zero and then starts counting 100 kc. pulses from an oscillator 106 at the same instant that the "constant current" circuit is switched in by control signal SP actuating switch 108. (When element No. 1 is being measured control signal $S_x1$ switches in adjustable resistor 110 via switch 112 to adjust this constant current to give the correct scale factor. This method of selecting scale factor is preferred to selecting a different value of $V_k$ for each element.) As soon as capacitor 98 is discharged to zero volts trigger amplifier 54 stops the scaler. The number stored in the scaler is now the true value of the actual percent concentration of the unknown element.

It should be noted that the actual antilog conversion takes place simultaneously while the log conversion function is being performed. (This saves an average of ½ second for 20 elements.) Only the linear discharge measurement must be performed to obtain the actual percent concentration which also takes approximately ½ second for 20 elements.

Having thus described the invention, what we claim and desire to obtain by Letters Patent of the United States is:

1. In a direct reading spectrometer for dispersing light from an excited specimen into its characteristic spectrum, apparatus for indicating directly the percentage of concentration of elements in said specimen, comprising:

(a) a plurality of transducers mounted on said spectrometer for receiving different portions of said spectrum, each of said transducers converting light energy from a selected portion of the spectrum into electrical energy;

(b) a plurality of storage capacitors electrically connected to said transducers for storing an unknown electrical charge corresponding to the intensity of the monitored spectrum portion, each one of said storage capacitors being connected to only one of each of said transducers, one of storage capacitors being elecrtically connected to one of said transducers mounted at a reference position for storing a charge corresponding to the intensity of a reference portion of said spectrum;

(c) a time register;

(d) a log measuring capacitor;

(e) an anti-log measuring capacitor;

(f) programming means for controlling the sequence of operation of the parts of the apparatus;

(g) first switching means controlled by said programming means to connect said log measuring capacitor to said reference capacitor so that said log measuring capacitor is charged to a voltage equal to that on said reference capacitor while said reference capacitor remains unchanged;

(h) second switching means controlled by said programming means and connected to said log measuring capacitor, one of said storage capacitors and said register so that said log measuring capacitor is logarithmically discharged until its voltage is equal to the voltage on said one of said storage capacitors, said register being operated during the log discharge period;

(i) a voltage source;

(j) third switching means controlled by said programming means to connect said anti-log measuring capacitor to said voltage source so that said anti-log measuring capacitor is charged to a predetermined voltage;

(k) fourth switching means controlled by said programming means to connect said anti-log measuring capacitor for simultaneous discharge during and for a time period equal to the log discharge period; and (l) means in said programming means for resetting said register to zero, for restarting said register and for linearly discharging said anti-log measuring capacitor until it is fully discharged, whereby the number indicated on said register at the end of the linear discharge period directly indicates the percentage of concentration of an element in said specimen.

2. Apparatus according to claim 1 including an analog to digital converter comprising a trigger amplifier operatively connected to said storage, log and anti-log capacitors, a fixed frequency pulse generator connected to and actuated by said amplifier, resistance means connected to said amplifier and fifth switching means for transferring the voltage on said storage capacitor through said resistance means to actuate said amplifier.

3. Apparatus according to claim 1 including voltage responsive and switching means controlled by said programming means for sequentially comparing the discharge of said log measuring capacitor with said storage capacitors.

4. In a direct reading spectrometer for dispersing light from an excited specimen into its characteristic spectrum, apparatus for indicating directly the percentage of concentration of elements in said specimen, comprising (a) a plurality of photo-multiplying tubes mounted on said spectrometer for receiving selected portions of said spectrum for converting light energy from said selected portions of the spectrum into electrical energy;

(b) a storage capacitor connected to each of said tubes for storing an unknown electrical charge corresponding to the intensity of the monitored spectrum portion;

(c) a log measuring capacitor;

(d) an anti-log measuring capacitor;

(e) one of said storage capacitor being a reference capacitor connected to a selected one of said tubes and charged to a level corresponding to the intensity of a reference line in said spectrum;

(f) first converting means connected to said log measuring capacitor and said reference capacitor for sequentially charging said log measuring capacitor to a voltage substantially equal to that of said reference capacitor while said reference capacitor remains unchanged;

(g) first switching means connected to said log measuring capacitor, for logarithmically discharging said log measuring capacitor until its voltage is equal to the voltage on one of said storage capacitors;

(h) a time register connected to said first switching means for recording a digital signal representing increments of time corresponding to the logrithmic discharge time period of said log measuring capacitor;

(i) a voltage source for charging said anti-log measuring capacitor to a predetermined voltage;

(j) second switching means connected to said anti-log measuring capacitor for simultaneously discharging said anti-log measuring capacitor for a time period substantially equal to the log discharge period;

(k) second converting means connected to said anti-log measuring capacitor and time register for resetting said register to zero, restarting said register and then linearly discharging said anti-log measuring capacitor until it is fully discharged, whereby the number indicated on said register at the end of the linear discharge period directly indicates the percentage of concentration of an element in said specimen; and (l) programming means connected to said first and second converting means and said first and second switching means for selected control thereof.

5. Apparatus according to claim 4 wherein said second converting means includes a digital register, a gate connected to said register, a constant frequency pulse generator connected to said gate and a trigger amplifier also connected to said gate, said amplifier when actuated opens said gate, whereby said register will count pulses from said generator.

References Cited
UNITED STATES PATENTS

| | | | |
|---|---|---|---|
| 3,227,038 | 1/1966 | Earle | 356—81 |
| 3,337,738 | 8/1967 | Price | 250—226 |

RONALD L. WIBERT, Primary Examiner

F. L. EVANS, Assistant Examiner

U.S. Cl. X.R.

356—98